Nov. 9, 1948.    H. O. BEECHING    2,453,401
LIVE JUMP ROLL
Filed Sept. 25, 1945    2 Sheets-Sheet 1
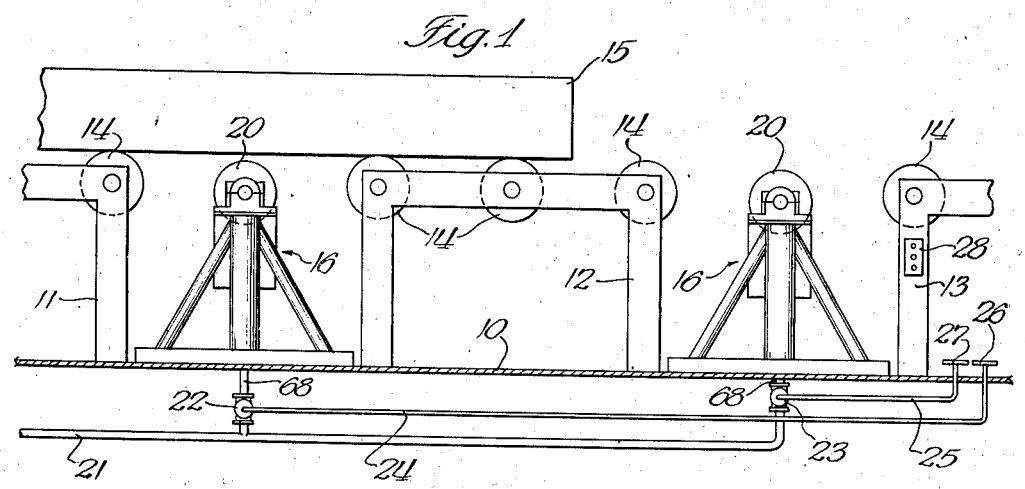
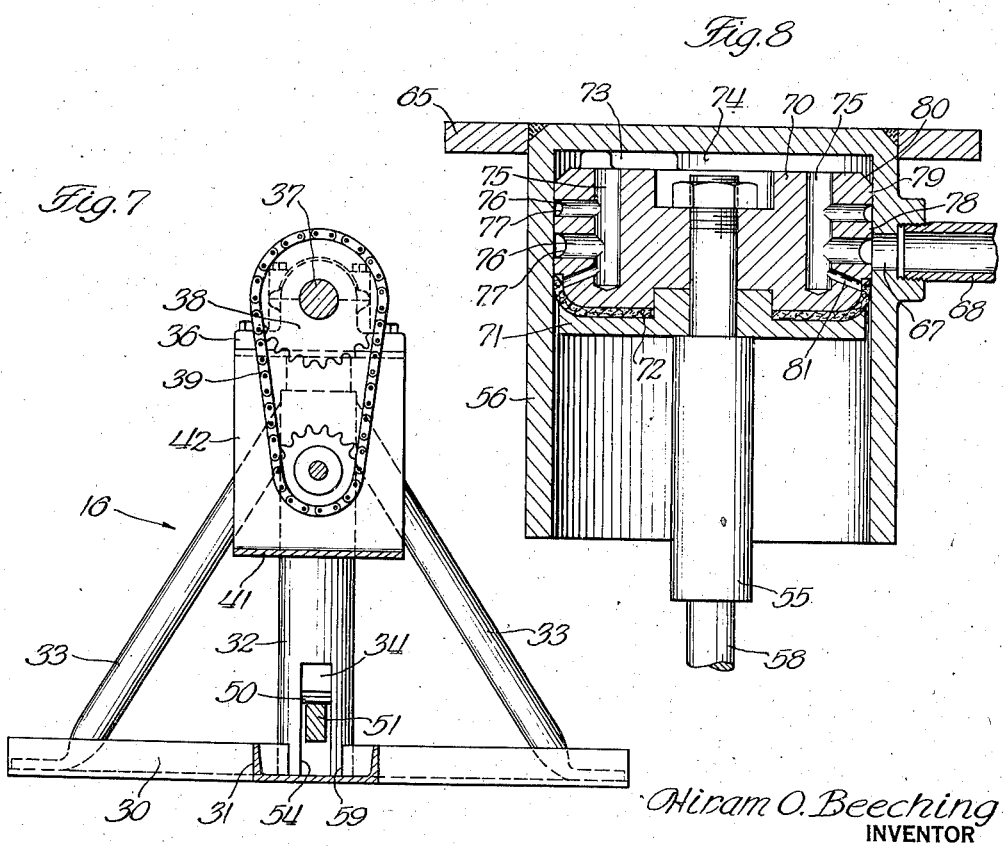
Hiram O. Beeching
INVENTOR
BY
ATTORNEY Nov. 9, 1948.  H. O. BEECHING  2,453,401
LIVE JUMP ROLL
Filed Sept. 25, 1945  2 Sheets-Sheet 2
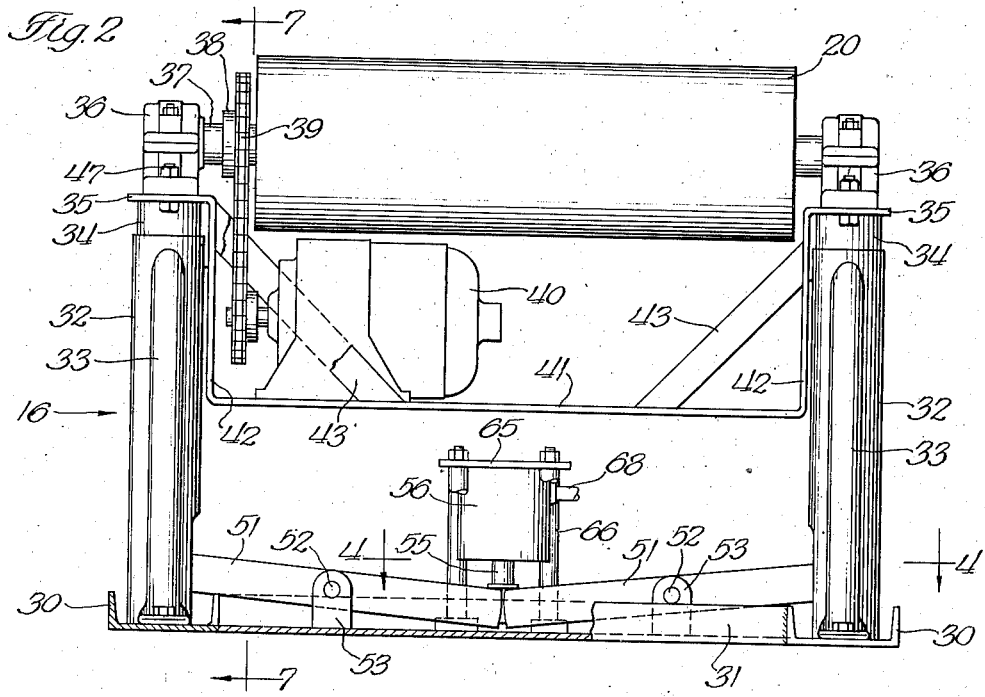
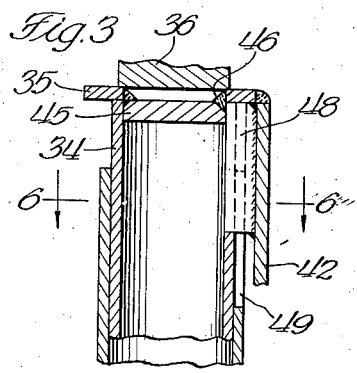
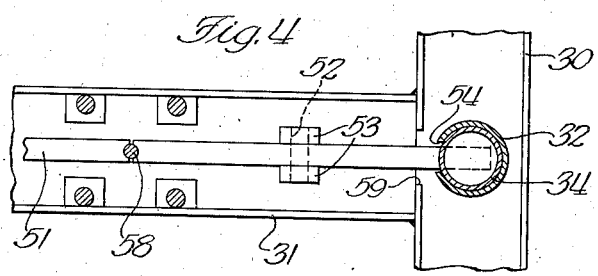
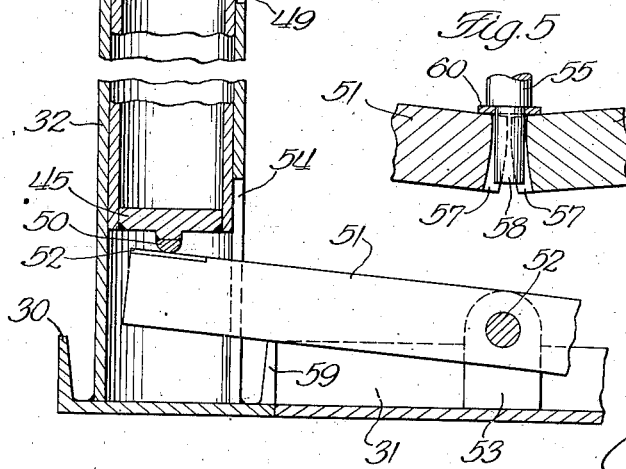
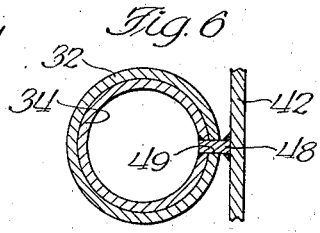
Hiram O. Beeching
INVENTOR
BY
ATTORNEY Patented Nov. 9, 1948

2,453,401

UNITED STATES PATENT OFFICE 2,453,401

LIVE JUMP ROLL

Hiram O. Beeching, South Bend, Wash.

Application September 25, 1945, Serial No. 618,488

8 Claims. (Cl. 198—127)

This invention relates to a novel power operated roll for article handling and conveying.

The present invention is most particularly concerned with the handling and conveying of articles under the control of an operator in situations where the articles are to be moved from time to time from one position to another.

An example of such situation is the handling of timber cants in a sawmill. In approaching certain sawing operations the cants are carried lengthwise on roller conveyors. In order to control the movement of the cant on its conveyor and to start and stop its motion when desired, it is desirable to deliver it to a series of idle rollers so that it will come to rest and be available for some sawing operation to be performed thereon as soon as the operator is ready for it. When it is desired to move the cant to continue its travel along the conveyor, the operator causes a pair of power driven rollers to be elevated between the idle rollers into driving engagement with the cant. If another cant is following immediately behind the first one, the operator will then lower the power rollers so that the second cant will come to rest on the idle rollers and remain in an available position above the retracted power rollers until it is needed. Such retractable power rollers are herein referred to as live jump rolls.

Conventional mechanism for handling heavy articles in this manner has heretofore been very awkward and clumsy to manipulate and susceptible to periodic breakdowns. The object of the present invention is to provide a live jump roll which is economical to manufacture, which is rugged and reliable in operation, and which is easily manipulatible by an operator to control the movements of articles handled thereby.

A further object is to provide a self contained live jump roll which may easily be installed in conveyor and article handling systems as a replacement for existing mechanism in such systems.

Another object is to provide a live jump roll constructed as a portable self contained unit adaptable to a variety of uses in mills, plants, factories and the like.

The invention is embodied in a power driven roll mounted on a portable frame which may easily be moved around a plant or factory and secured temporarily or permanently in place where needed with little disturbance or alteration to existing equipment. The frame comprises essentially a rugged base having a pair of standards supporting a live roll and an electric motor drive. The standards serve as guides for vertically movable posts upon which the bearings for the roll are mounted. These posts also support a shelf directly beneath the roller for an electric motor connected with the roller by a chain drive. In the preferred embodiment a transverse member in the base of the frame between the two standards carries an air cylinder for raising the roll. The piston in the cylinder engages the ends of a pair of oppositely directed levers upon which the posts are supported in the standards so that when air pressure is admitted to the cylinder, the action of the piston upon the two levers raises the posts to elevate the roll into contact with the article to be moved. Start, stop and reverse control buttons for the motor, and a flexible remote control for an air valve in the cylinder air supply are mounted conveniently at the operator's station so that he has complete control of the operation of the roll.

The invention will be described in greater detail with reference to the accompanying drawings showing a preferred embodiment. Various changes in the construction and arrangement will occur to those skilled in the art, and all such modifications are included in the invention, the same being limited only by the scope of the appended claims.

In the drawings:

Figure 1 is a side elevational view of a portion of a conveyor system showing two of the present live jump rolls installed for moving articles along the conveyor;

Figure 2 is a view of one of the live jump rolls in front elevation;

Figure 3 is a sectional view through one of the standards showing the mechanism for raising the roll;

Figure 4 is a sectional view taken on the line 4—4 of Figure 2;

Figure 5 is a detail view in section showing the manner in which the roll raising levers are engaged by the piston rod extending from the power cylinder;

Figure 6 is a cross sectional view through one of the roll supporting standards taken on the line 6—6 of Figure 3;

Figure 7 is a view taken on the line 7—7 of Figure 2; and

Figure 8 is a sectional view through the power cylinder showing the construction of the piston therein.

Referring first to Figure 1, the numeral 10 indicates a floor or other supporting surface for a plurality of conveyor frames 11, 12 and 13. These frames carry idler rollers 14 for transporting a timber cant 15, or other article. Such conveyor systems are not new, but my invention comprises a live jump roll mechanism, indicated generally by the numeral 16, shown situated between the conveyor frames 11 and 12, and 12 and 13 for moving whatever articles are carried by the conveyor. The live jump roll mechanism 16 is provided with a power cylinder and other mechanism to be presently described for elevating a power driven roller 20 into engagement with the cant 15, the rolls 20 ordinarily remaining in a retracted position, as shown, so as to be ineffective. A pipe 21 supplies compressed air for the power cylinder in each of the live jump mechanisms 16 under the control of individual valves 22 and 23. These valves may conveniently be operated by flexible control wires 24 and 25, or by other known means operable by foot pedals or levers 26 and 27 at an operator's station. The rolls 20 are electrically driven and are started, stopped and reversed by a push button control 28 at the operator's station, which control may be connected to both rolls or which may be duplicated for individual control of each roll. The operator's station may comprise any preselected position along the conveyor line, or it may be at a machine where some operation is to be performed on the material or articles handled by the conveyor. For instance, the conveyor frame designated at 13 may in fact be at the entrance to a planer or saw or other machine for performing some operation upon the cant 15. By means of the air valve controls 26 and 27 and the push button control 28, an operator at this station may move a cant forward or backward or hold it stationary as he may desire. The conveyor system shown in Figure 1 merely illustrates one manner in which the live jump mechanism 16 may be used to advantage. The present invention is not limited to use in a conveyor system, however, as many other uses will suggest themselves to those skilled in the art.

Referring now to Figure 2 and the subsequent views, the live jump mechanism 16 will be described in detail. The mechanism designated by the numeral 16 constitutes a portable unit which may easily be moved about and bolted to the floor wherever it is desired to be used. The mechanism is all mounted on a pair of channel members 30 which are interconnected by a cross channel 31, and, if desired, the supporting base constituted by these channels may be bolted to a pair of timbers serving as skids to facilitate moving the device over the floor to where it is needed. An upright tubular guide standard 32 is rigidly mounted in the center of each of the channels 30 and braced with tubular struts 33. Each tubular standard 32 provides guiding support for a vertical slidable guide post 34 therewithin having a cap plate 35 on which is mounted a bearing 36 for one end of the roll 20. The roll 20 is supported in the bearings by means of a shaft 37 which also carries a sprocket 38 having a chain drive 39 from an electric motor 40. The motor 40 is secured to a shelf 41 directly beneath the roll 20 and having upright end portions 42 connected with the cap plates 35. Braces 43 lend the necessary stiffness and rigidity to the shelf 41. The posts 34, together with the cap plates 35 and shelf 41, may be said to constitute a vertically movable chassis for supporting the motor driven roll 20.

Further details of the construction of the chassis and the means for raising and lowering the chassis are shown in Figure 3. In the present embodiment the ends of the tubular posts 34 are closed by discs or plugs 45 welded in place as shown. The weld securing the upper disc 45 is designated by the numeral 46, and this weld also secures the cap plate 35, the latter having a circular opening corresponding with the inside diameter of the post 34. The bearings 36 are secured to the cap plates 35 by means of bolts 47. A narrow plate 48 is welded on edge between the end plate 42 of the shelf and the post 34, the latter having a vertical slot into which the plate 48 is received for welding as further illustrated in Figure 6. The plate 48 thereby stiffens the end plate 42 with respect to the post 34 and maintains it free and clear of the guide standard 32 which is slotted at 49 to receive and guide the plate 48 in the vertical movement of the chassis.

The lower cap or plug 45 is provided on its lower face with a hardened semi-cylindrical bar 50 for supporting the post 34 on an elevating lever 51, a hardened member or surface 52 being provided on the lever 51 for engagement with the bar 50. The two posts 34 are of identical construction and are arranged to be raised simultaneously by a pair of the levers 51 fulcrumed on pins 52 in short standards or brackets 53 supported on the cross channel 31. The inner ends of the levers 51 are brought close together at the center of the cross channel for simultaneous actuation by a piston rod 55 extending downwardly from a power cylinder 56. As shown in Figures 2, 4 and 5, the inner ends of the levers 51 are cut on the arcs of circles centered on the pins 52 so that they will come close together without binding, and are mutually recessed at 57 to form a bore for receiving a reduced end 58 on the piston rod. A washer 60 is inserted on the reduced end 58 above the levers 51 to take the wear resulting from frequent operation of the mechanism. It will be observed that in Figures 2, 3, 5 and 7 the parts are shown in the positions they would occupy with the chassis maintained in fully raised position by the downward thrust of piston rod 55 on the inner ends of the elevating levers 51. This downward force on the piston rod is produced by air or hydraulic pressure in the power cylinder 56, and when the pressure is released the weight of the chassis is sufficient to lower the roll 20 immediately, to the position shown in Figure 1. The guide standards 32 are slotted at 54 to receive the levers 51, and the channel 30 is slotted at 59 for the same purpose. In the lower position of the chassis the cap plates 35 rest upon the standards 32.

The cylinder 56 has a base flange 65 by which it is secured to the cross channel 31 by means of four bolts, or the like, 66. The cylinder and piston are of unique construction to reduce the overall height for clearance beneath the shelf 41. Through the use of a piston of novel design, the air pressure pipe 68 connected with the line 21 communicates with the cylinder through a side port 67 instead of by means of a port in the end of the cylinder. The port 67 constitutes the only communication with the interior of the cylinder.

The body of the piston designated by the numeral 70, is secured to the piston rod 55 in combination with a cap 71 and a cup leather or other cup shaped seal 72 as shown in Figure 8. The head of the piston body is provided with a plurality of projections 73 to maintain a space 74 between the body of the piston and the cylinder head, and communicating with this space is a pair of longitudinal holes 75 in the piston body. Lateral passages 76 communicate with annular grooves 77 around the piston, the lower of which is on the level of the port 67 when the piston is in fully raised position as shown. Thus, air pressure admitted to the port 67 is applied to the piston head in the space 74 to start the piston moving downwardly. Since the port 67 is wider than the bridge 78 between the grooves 77, and also wider than the bridge 79 between the upper groove 77 and the beveled upper edge 80 of the piston, the pneumatic pressure established in the pipe 68 is always present in the space 74 adjacent the head of the piston regardless of the position of the piston in the cylinder. Lateral ducts 81 intersecting the holes 75 are also provided to inflate the cup leather 72 and prevent leakage around the piston. The valves 22 and 23 are arranged to bleed each pipe 68 in their off positions so as to permit the return of the pistons to their raised positions under the leverage exerted thereon by the weight of each chassis and roll 20.

By placing the valve pedals 26 and 27 close together they may be operated individually or simultaneously by a single foot movement to raise either one or both of the live rolls 20. Ordinarily it is not intended that the live rolls should lift the cant 15 off the adjacent idler rolls but only that they should bear against the under surface of the cant with sufficient force to exert the necessary tractive effort. By reversing one or both motors 40 the cant may be stopped and backed up at will so as not to interfere with the preceding piece.

The present live jump roll may also be used in other ways in the handling of different kinds of articles for special purposes, not necessarily including conveyor equipment, and all such uses to which the device may be put are included within the contemplation of the invention.

Having now described my invention and in what manner the same may be used, what I claim as new and desire to protect by Letters Patent is:

1. A live jump roll comprising a portable frame, spaced tubular standards on said frame, posts vertically slidable in said standards, a chassis carried by said posts, bearings mounted on said posts, a roll mounted in said bearings, a motor mounted on said chassis for driving said roll, a pair of levers mounted on said frame for raising and lowering said posts, and a power cylinder mounted on said frame for operating said levers.

2. A live jump roll comprising a chassis, spaced bearings on said chassis mounting a power driven roll, a pair of tubular posts disposed beneath said bearings for supporting said chassis, a frame having a pair of tubular guide standards receiving said posts for vertical sliding movement therein, a pair of levers mounted on said frame between said standards and having outer ends engaging the lower ends of said posts, and a power cylinder mounted on said frame and operable upon the inner ends of said levers to raise and lower said chassis.

3. A live jump roll assembly comprising a chassis, spaced bearings on said chassis mounting a power driven roll, a pair of tubular posts supporting said chassis, a pair of tubular guide standards receiving said posts for vertical movement therein, a transverse member interconnecting said standards, a pair of levers fulcrumed on said transverse member engaging the lower ends of said posts, and a power cylinder mounted in the center of said transverse member and having a piston operable upon said levers to raise and lower said chassis, said standards and transverse member constituting a portable frame for said assembly.

4. A live jump roll comprising a pair of upright tubular guide standards, posts vertically movable in said standards, bearings mounted on the upper ends of said posts, a motor driven roll in said bearings, a cross member vertically beneath said roll and interconnecting said standards, a pair of levers pivotally mounted on said cross member and supporting the lower ends of said posts, and a power cylinder mounted on said cross member and operable upon said levers to raise and lower said roll.

5. In a live jump roll, a pair of tubular guide standards, a cross member interconnecting said standards at their bases, a power cylinder mounted on said cross member, a pair of levers pivotally mounted on said cross member, said levers having adjacent ends engageable by a piston in said cylinder and opposite ends extending into said guide standards, a pair of vertically movable posts supported upon the ends of said levers in said standards, bearing supported upon said posts, a roll supported in said bearings, a shelf supported upon said posts beneath said roll, and a motor on said shelf for driving said roll.

6. In a conveyor system having a plurality of idler rolls for supporting articles, a pair of power driven rolls interposed at a spaced interval between said idler rolls and normally gravity retracted therebelow, individual fluid pressure means for raising said power rolls to the level of said idler rolls, individual valves for admitting fluid pressure to said means for raising said rolls and for releasing said pressure to lower said rolls, and an operator's station having adjacent pedal controls for said valves arranged for convenient individual or simultaneous manipulation to raise either one or both of said power rolls, and having control means for operating said power rolls in either direction of rotation.

7. A self-contained portable live jump roll comprising a portable frame, a chassis, a roll mounted in bearings on said chassis, a motor mounted on said chassis for driving said roll, posts supporting said chassis for vertical movement in said frame, an individual lever for raising each of said posts, and a fluid pressure cylinder mounted in said frame and having a piston operable upon said levers for raising said chassis to an upper position when fluid pressure is admitted to said cylinder and operable to release said chassis for gravity return to a lower position upon release of fluid pressure from said cylinder.

8. A self-contained portable live jump roll comprising a portable frame, a chassis, a roll mounted in bearings on said chassis, a motor mounted on said chassis for driving said roll, a pair of standards in said frame, posts on said chassis at opposite ends of said roll vertically slidable with respect to said standards for supporting said chassis in vertical movement, means to support said posts and chassis in a lower position, a fluid cylinder and piston mounted in the base of said frame, and levers operable by said piston engaging said posts to raise said chassis when fluid pressure is admitted to said cylinder and to release said posts for gravity return of said chassis to said lower position when said fluid pressure is removed.

HIRAM O. BEECHING.

REFERENCES CITED

The following references are of record in the file of this patent:

UNITED STATES PATENTS

| Number | Name | Date |
|---|---|---|
| 711,947 | Dittbenner | Oct. 28, 1902 |
| 1,045,873 | Neave | Dec. 3, 1912 |
| 1,432,086 | Plonka | Oct. 17, 1922 |
| 1,838,592 | Sylvester | Dec. 29, 1931 |
| 1,861,963 | Jennings | June 7, 1932 |
| 2,234,162 | Anderson | Mar. 11, 1941 |
| 2,353,239 | Horstkotte | July 11, 1944 |